United States Patent
Uchida

(10) Patent No.: US 10,240,945 B2
(45) Date of Patent: Mar. 26, 2019

(54) CORRELATION COEFFICIENT CORRECTION METHOD, EXERCISE ANALYSIS METHOD, CORRELATION COEFFICIENT CORRECTION APPARATUS, AND PROGRAM

(71) Applicant: Seiko Epson Corporation, Shinjuku-ku (JP)

(72) Inventor: Shuji Uchida, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 204 days.

(21) Appl. No.: 15/128,948

(22) PCT Filed: Mar. 12, 2015

(86) PCT No.: PCT/JP2015/001386
§ 371 (c)(1),
(2) Date: Sep. 23, 2016

(87) PCT Pub. No.: WO2015/146046
PCT Pub. Date: Oct. 1, 2015

(65) Prior Publication Data
US 2018/0180442 A1    Jun. 28, 2018

(30) Foreign Application Priority Data

Mar. 25, 2014 (JP) ................................. 2014-061550

(51) Int. Cl.
*G06F 19/00* (2018.01)
*G01C 22/00* (2006.01)
(Continued)

(52) U.S. Cl.
CPC .......... *G01C 22/006* (2013.01); *G01C 21/16* (2013.01); *G01C 21/165* (2013.01); *G01P 7/00* (2013.01);
(Continued)

(58) Field of Classification Search
CPC ............ A63B 2022/067; A63B 22/001; A63B 22/0664
See application file for complete search history.

(56) References Cited

U.S. PATENT DOCUMENTS

| 8,718,970 | B2 | 5/2014 | Uchida |
| 2005/0043145 | A1* | 2/2005 | Anderson ............ A63B 22/001 |
| | | | 482/52 |
| 2007/0208544 | A1 | 9/2007 | Kulach et al. |

FOREIGN PATENT DOCUMENTS

| JP | 2011-149923 A | 8/2011 |
| JP | 2012-233731 A | 11/2012 |
| JP | 2014-185955 A | 10/2014 |

OTHER PUBLICATIONS

Supplementary European Search Report dated Nov. 7, 2017 in corresponding European Application No. 15 768 410.1; (11 pages).

\* cited by examiner

*Primary Examiner* — Edward Raymond
(74) *Attorney, Agent, or Firm* — Kilpatrick Townsend & Stockton LLP

(57) ABSTRACT

Disclosed are a correlation coefficient correction method, a correlation coefficient correction apparatus, and a program, capable of improving estimation accuracy of a walking velocity or a stride of a moving object, and an exercise analysis method capable of analyzing a user's exercise with high accuracy. In one aspect, the correlation coefficient correction method includes calculating a reference velocity by using a detection result in a first sensor, calculating characteristic information regarding walking of a moving object by using a detection result in a second sensor mounted on the moving object, and correcting a correlation coefficient in a correlation expression indicating a correlation between (Continued)

the characteristic information and a walking velocity or a stride of the moving object by using the reference velocity.

11 Claims, 9 Drawing Sheets

(51) Int. Cl.
*G01P 7/00* (2006.01)
*G01P 21/02* (2006.01)
*G01C 21/16* (2006.01)
*G06K 9/00* (2006.01)

(52) U.S. Cl.
CPC .......... *G01P 21/02* (2013.01); *G06K 9/00348* (2013.01)

310

| DETECTION TIME | ACCELERATION | ANGULAR VELOCITY |
|---|---|---|
| t1 | (ax1, ay1, az1) | (ωx1, ωy1, ωz1) |
| t2(=t1+Δt) | (ax2, ay2, az2) | (ωx2, ωy2, ωz2) |
| t3(=t2+Δt) | (ax3, ay3, az3) | (ωx3, ωy3, ωz3) |
| ⋮ | | |

| POSITIONING TIME POINT | POSITION | VELOCITY | POSITIONING ACCURACY (DOP) | SIGNAL INTENSITY | ... |
|---|---|---|---|---|---|
| T1 | (Px1, Py1, Pz1) | (Vx1, Vy1, Vz1) | DP1 | SS1 | ... |
| T2 | (Px2, Py2, Pz2) | (Vx2, Vy2, Vz2) | DP2 | SS2 | ... |
| T3 | (Px3, Py3, Pz3) | (Vx3, Vy3, Vz3) | DP3 | SS3 | |
| ⋮ | | | | | |

| COMPUTATION TIME POINT | VELOCITY | POSITION | ATTITUDE ANGLE |
|---|---|---|---|
| t1 | (vx1, vy1, vz1) | (px1, py1, pz1) | (φ1, θ1, ψ1) |
| t2(=t1+Δt) | (vx2, vy2, vz2) | (px2, py2, pz2) | (φ2, θ2, ψ2) |
| t3(=t2+Δt) | (vx3, vy3, vz3) | (px3, py3, pz3) | (φ3, θ3, ψ3) |
| ⋮ | | | |

CORRELATION COEFFICIENT CORRECTION METHOD, EXERCISE ANALYSIS METHOD, CORRELATION COEFFICIENT CORRECTION APPARATUS, AND PROGRAM

CROSS-REFERENCES TO RELATED APPLICATIONS

This application is a National Phase of International Application No. PCT/JP2015/001386, filed Mar. 12, 2015, which claims priority to Japanese Patent Application No. 2014-061550, filed Mar. 25, 2014, the entireties of which are hereby incorporated by reference.

BACKGROUND

Technical Field

The present invention relates to a correlation coefficient correction method, an exercise analysis method, a correlation coefficient correction apparatus, and a program.

Background Art

There is predetermined rhythm such as the body periodically moving vertically in a person's walking, and thus there is a correlation between a vertical movement acceleration of the body and a walking velocity or a stride. Therefore, there is a method in which vertical movement during a user's walking is specified so that a walking velocity or a stride is estimated, and thus a walking distance or a movement trajectory of the user is calculated. For example, PTL 1 proposes a method in which a navigation apparatus is mounted on a user's waist, a vertical movement acceleration of the waist is detected with an acceleration sensor built into the navigation apparatus, a stride of the user is predicted by using a correlation expression between acceleration and stride, obtained in advance, and a movement trajectory is calculated on the basis of the predicted stride. Particularly, in PTL 1, focusing on the fact that the degree of the correlation between the vertical movement acceleration and the stride changes depending on a velocity of the user, the velocity of the user is determined in three stages such as a low velocity, an intermediate velocity, and a high velocity, and stride estimation accuracy can be improved more than in the related art by changing a correlation coefficient of the correlation expression in three stages depending on the velocity.

CITATION LIST

Patent Literature

PTL 1: JP-A-2011-149923

SUMMARY OF INVENTION

Technical Problem

However, since the degree of correlation between a vertical movement acceleration and a walking velocity or a stride differs for each person due to a difference in a user's physique, way of walking, or the like, a variation occurs in estimation accuracy between users in the method disclosed in PTL 1. If even the same user uses a different way of walking, the degree of correlation between a vertical movement acceleration and a walking velocity or a stride changes, and thus there is a case where necessarily sufficient estimation accuracy may not be obtained in the method disclosed in PTL 1.

The present invention has been made in consideration of the above-described problems, and, according to some aspects of the present invention, it is possible to provide a correlation coefficient correction method, a correlation coefficient correction apparatus, and a program, capable of improving estimation accuracy of a walking velocity or a stride of a moving object, and an exercise analysis method capable of analyzing a user's exercise with high accuracy.

Solution to Problem

The present invention has been made in order to solve at least some of the above-described problems, and can be realized in the following aspects or application examples.

Application Example 1

A correlation coefficient correction method according to this application example, includes calculating a reference velocity by using a detection result in a first sensor; calculating characteristic information regarding walking of a moving object by using a detection result in a second sensor mounted on the moving object; and correcting a correlation coefficient in a correlation expression indicating a correlation between the characteristic information and a walking velocity or a stride of the moving object by using the reference velocity.

According to the correlation coefficient correction method of the application example, it is possible to dynamically correct a correlation coefficient in a correlation expression between characteristic information regarding walking of a moving object and a walking velocity or a stride of the moving object, according to walking characteristics or a walking state of the moving object. Therefore, values in the correlation expression are computed by using the correlation coefficient which is corrected by using the correlation coefficient correction method according to the application example, and thus it is possible to estimate a walking velocity or a stride of the moving object while dynamically reflecting the walking characteristics or the walking state of the moving object. As a result, it is possible to improve estimation accuracy.

Application Example 2

The correlation coefficient correction method according to the application example may further include detecting a walking cycle of the moving object by using the detection result in the second sensor, and the characteristic information may be calculated in synchronization with the walking cycle.

According to the correlation coefficient correction method of the application example, a correlation coefficient is corrected by using periodicity of a walking state of the moving object, and thus it is possible to correct the correlation coefficient with high accuracy.

Application Example 3

In the correlation coefficient correction method according to the application example, the walking cycle may be detected by using a vertical movement acceleration of the moving object.

According to the correlation coefficient correction method of the application example, a vertical movement acceleration which periodically changes while the moving object is walking is specified, and thus it is possible to detect a walking cycle with high accuracy.

Application Example 4

In the correlation coefficient correction method according to the application example, a vertical movement velocity of the moving object is calculated by using the detection result in the second sensor, and the walking cycle may be detected by using the vertical movement velocity of the moving object.

According to the correlation coefficient correction method of the application example, a vertical movement acceleration which periodically changes while the moving object is walking is specified, and thus it is possible to detect a walking cycle with high accuracy.

Application Example 5

In the correlation coefficient correction method according to the application example, the characteristic information may be the amplitude of the vertical movement acceleration of the moving object in the walking cycle.

According to the correlation coefficient correction method of the application example, since the amplitude of the vertical movement acceleration having a high correlation with a walking velocity or a stride is used as characteristic information, it is possible to estimate a walking velocity or a stride of the moving object by using a corrected correlation coefficient.

Application Example 6

In the correlation coefficient correction method according to the application example, a reference stride may be calculated by using the reference velocity, and the correlation coefficient in the correlation expression indicating the correlation between the characteristic information and the stride may be corrected by using the reference stride.

According to the correlation coefficient correction method of the application example, it is possible to correct the correlation coefficient between the characteristic information and the stride with high accuracy.

Application Example 7

In the correlation coefficient correction method according to the application example, the first sensor may include a sensor which receives a signal from a positioning satellite.

According to the correlation coefficient correction method of the application example, it is possible to calculate a reference velocity by using a signal from the positioning satellite.

Application Example 8

In the correlation coefficient correction method according to the application example, the second sensor may include an acceleration sensor.

According to the correlation coefficient correction method of the application example, it is possible to calculate characteristic information by using a detection result in the acceleration sensor.

Application Example 9

An exercise analysis method according to this application example includes correcting the correlation coefficient by using any one of the correlation coefficient correction methods; calculating the walking velocity or the stride of the moving object by using the corrected correlation coefficient; estimating errors of indexes indicating a state of the moving object by using the calculated walking velocity or the stride; correcting the indexes by using the estimated errors; and analyzing exercise of the moving object by using the corrected indexes.

According to the exercise analysis method of the application example, it is possible to correct indexes indicating a state of the moving object with high accuracy by using a correlation coefficient which is corrected by using the correlation coefficient correction method according to the application example, and thus to analyze exercise of the moving object with high accuracy by using the indexes.

Application Example 10

A correlation coefficient correction apparatus according to this application example includes a reference velocity calculation section that calculates a reference velocity by using a detection result in a first sensor; a walking characteristic information calculation section that calculates characteristic information regarding walking of a moving object by using a detection result in a second sensor mounted on the moving object; and a correlation coefficient correction section that corrects a correlation coefficient in a correlation expression indicating a correlation between the characteristic information and a walking velocity or a stride of the moving object by using the reference velocity.

According to the correlation coefficient correction apparatus of the application example, it is possible to dynamically correct a correlation coefficient in a correlation expression between characteristic information regarding walking of a moving object and a walking velocity or a stride of the moving object, according to walking characteristics of a walking state of the moving object. Therefore, values in the correlation expression are computed by using the correlation coefficient which is corrected by using the correlation coefficient correction apparatus according to the application example, and thus it is possible to estimate a walking velocity or a stride of the moving object while dynamically reflecting the walking characteristics or the walking state of the moving object. As a result, it is possible to improve estimation accuracy.

Application Example 11

A program according to this application example causes a computer to execute calculating a reference velocity by using a detection result in a first sensor; calculating characteristic information regarding walking of a moving object by using a detection result in a second sensor mounted on the moving object; and correcting a correlation coefficient in a correlation expression indicating a correlation between the characteristic information and a walking velocity or a stride of the moving object by using the reference velocity.

According to the program of the application example, it is possible to dynamically correct a correlation coefficient in a correlation expression between characteristic information regarding walking of a moving object and a walking velocity or a stride of the moving object, according to walking characteristics or a walking state of the moving object.

Therefore, values in the correlation expression are computed by using the correlation coefficient which is corrected by using the program according to the application example, and thus it is possible to estimate a walking velocity or a stride of the moving object while dynamically reflecting the walking characteristics or the walking state of the moving object. As a result, it is possible to improve estimation accuracy.

BRIEF DESCRIPTION OF DRAWINGS

FIG. 3 is a diagram illustrating configuration example of a sensing data table.

FIG. 4 is a diagram illustrating a configuration example of a GPS data table.

FIG. 5 is a diagram illustrating a configuration example of a calculated data table.

DESCRIPTION OF EMBODIMENT

Hereinafter, preferred embodiments of the present invention will be described in detail with reference to the drawings. The embodiments described below are not intended to improperly limit the content of the present invention disclosed in the claims. It cannot be said that all constituent elements described below are essential constituent elements of the present invention.

1. EXERCISE ANALYSIS SYSTEM 1-1. Outline of System

Figure 1:
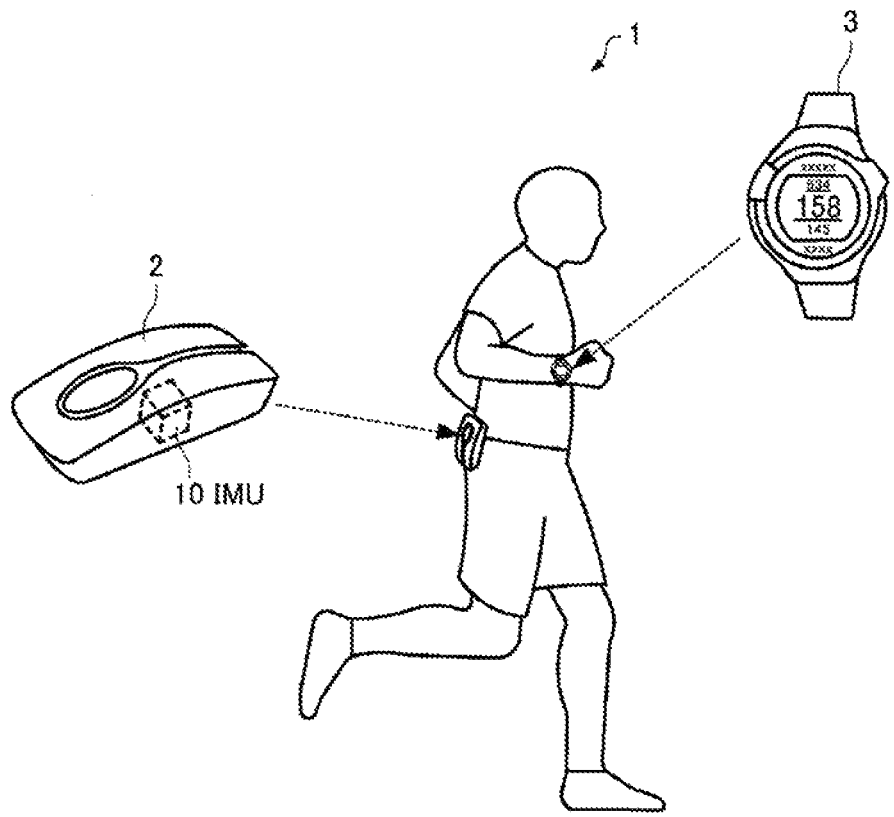
FIG. 1 is a diagram illustrating an outline of a exercise analysis system according to the present embodiment.

FIG. 1 is a diagram for explaining an outline of an exercise analysis system 1 according to the present embodiment. As illustrated in FIG. 1, the exercise analysis system 1 of the present embodiment includes an exercise analysis apparatus 2 and a display apparatus 3. The exercise analysis apparatus 2 is mounted on a body part (for example, a right-side waist or a left-side waist) of a user (an example of a moving object). The exercise analysis apparatus 2 has an inertial measurement unit (IMU) 10 built thereinto, recognizes motion of the user in walking (including running), computes velocity, a position, attitude angles (a roll angle, a pitch angle, and a yaw angle), and the like, and analyzes a user's exercise so as to generate exercise analysis information. In the present embodiment, the exercise analysis apparatus 2 is mounted on the user so that one detection axis (hereinafter, referred to as a z axis) of the inertial measurement unit (IMU) 10 substantially matches the gravitational acceleration direction (vertically downward direction) in a state in which the user stands still. The exercise analysis apparatus 2 transmits the generated exercise analysis information to the display apparatus 3.

The display apparatus 3 is a wrist type (wristwatch type) portable information apparatus and is mounted on a user's wrist or the like. However, the display apparatus 3 may be a portable information apparatus such as a head mounted display (HMD) or a smart phone. The user operates the display apparatus 3 so as to instruct the exercise analysis apparatus 2 to start or finish measurement. The display apparatus 3 transmits a command for instructing measurement to be started or finished, to the exercise analysis apparatus 2. If a command for starting measurement has been received, the exercise analysis apparatus 2 causes the inertial measurement unit (IMU) 10 to start measurement, and analyzes the user's exercise on the basis of a measurement result so as to generate exercise analysis information. The exercise analysis apparatus 2 transmits the generated exercise analysis information to the display apparatus 3. The display apparatus 3 receives the exercise analysis information, and presents the received exercise analysis information to the user in various forms such as text, graphics, and sound. The user can recognize the exercise analysis information via the display apparatus 3.

Data communication between the exercise analysis apparatus 2 and the display apparatus 3 may be wireless communication or wired communication.

In the present embodiment, hereinafter, as an example, a detailed description will be made of a case where the exercise analysis apparatus 2 generates exercise analysis information including a movement path, a movement time period, or the like by estimating a walking velocity of the user, but the exercise analysis system 1 of the present embodiment is also applicable to a case where exercise analysis information is generated in exercise causing movement other than walking.

1-2. Coordinate System

Coordinate systems necessary in the following description are defined.

Figure 2:
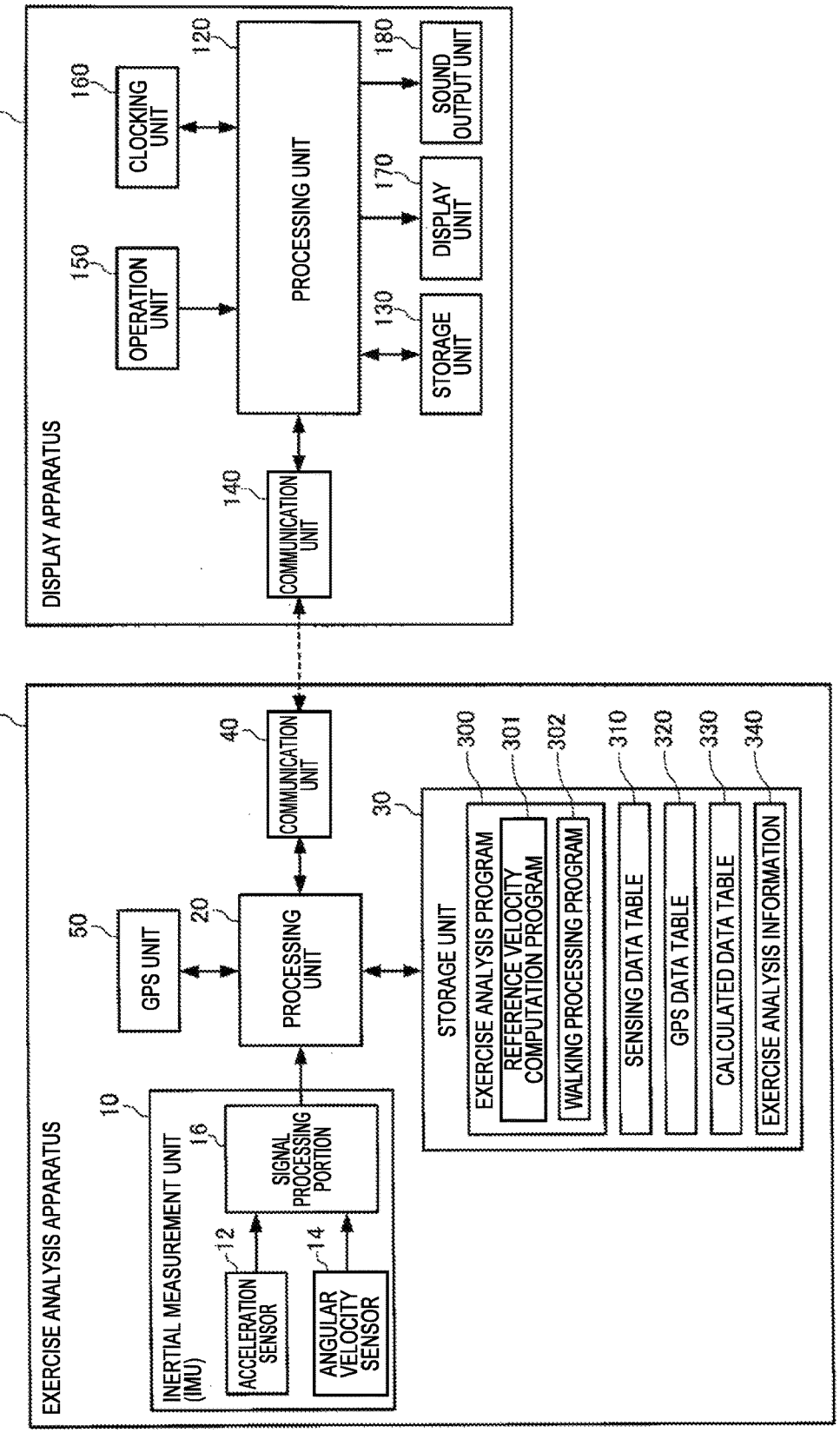
FIG. 2 is a functional block diagram illustrating configuration examples of an exercise analysis apparatus and a display apparatus.

Earth center earth fixed frame (e frame): right handed three-dimensional orthogonal coordinates in which the center of the earth is set as an origin, and a z axis is taken so as to be parallel to the axis of the earth Navigation frame (n frame): three-dimensional orthogonal coordinate system in which a moving object (user) is set as an origin, and an x axis is set to the north, a y axis is set to the east, and a z axis is set to the gravitational direction Body frame (b frame): three-dimensional orthogonal coordinate system using a sensor (the inertial measurement unit (IMU) 10) as a reference Moving frame (m frame): right handed three-dimensional orthogonal coordinate system in which a moving object (user) is set as an origin, and an advancing direction of the moving object (user) is set as an x axis 1-3. Configuration of System FIG. 2 is a functional block diagram illustrating configuration examples of the exercise analysis apparatus 2 and the display apparatus 3. As illustrated in FIG. 2, the exercise analysis apparatus 2 (an example of a correlation coefficient correction apparatus) includes the inertial measurement unit (IMU) 10, a processing unit 20, a storage unit 30, a communication unit 40, and a global positioning system (GPS) unit 50. However, the exercise analysis apparatus 2 of the present embodiment may have a configuration in which some of the constituent elements are deleted or changed, or other constituent elements may be added thereto.

The inertial measurement unit 10 (an example of a second sensor) includes an acceleration sensor 12, an angular velocity sensor 14, and a signal processing portion 16.

The acceleration sensor 12 detects respective accelerations in the three-axis directions which intersect each other (ideally, orthogonal to each other), and outputs a digital signal (acceleration data) corresponding to magnitudes and directions of the detected three-axis accelerations.

The angular velocity sensor 14 detects respective angular velocities in the three-axis directions which intersect each other (ideally, orthogonal to each other), and outputs a digital signal (angular velocity data) corresponding to magnitudes and directions of the detected three-axis angular velocities.

The signal processing portion 16 receives the acceleration data and the angular velocity data from the acceleration sensor 12 and the angular velocity sensor 14, respectively, adds time information thereto, stores the data items and the time information in a storage unit (not illustrated), generates sensing data in which the stored acceleration data, angular velocity data and time information conform to a predetermined format, and outputs the sensing data to the processing unit 20.

The acceleration sensor 12 and the angular velocity sensor 14 are ideally installed so that three axes thereof match three axes of a sensor coordinate system (b frame) with the inertial measurement unit 10 as a reference, but, in practice, an error occurs in an installation angle. Therefore, the signal processing portion 16 performs a process of converting the acceleration data and the angular velocity data into data of the sensor coordinate system (b frame) by using a correction parameter which is calculated in advance according to the installation angle error. Instead of the signal processing portion 16, the processing unit 20 which will be described later may perform the process.

The signal processing portion 16 may perform a temperature correction process on the acceleration sensor 12 and the angular velocity sensor 14. Instead of the signal processing portion 16, the processing unit 20 to be described later may perform the temperature correction process, and a temperature correction function may be incorporated into the acceleration sensor 12 and the angular velocity sensor 14.

The acceleration sensor 12 and the angular velocity sensor 14 may output analog signals, and, in this case, the signal processing portion 16 may A/D convert an output signal from the acceleration sensor 12 and an output signal from the angular velocity sensor 14 so as to generate sensing data.

The GPS unit 50 (an example of a first sensor) receives a GPS satellite signal which is transmitted from a GPS satellite which is one type of positioning satellite, performs positioning computation by using the GPS satellite signal so as to calculate a position and velocity (which is a vector including a magnitude and a direction) of the user in n frames, and outputs GPS data in which time information or positioning accuracy information is added to the calculated results to the processing unit 20. A method of calculating a position or velocity or a method of generating time information by using GPS is well known, and thus detailed description thereof will be omitted.

The processing unit 20 is constituted of, for example, a central processing unit (CPU), a digital signal processor (DSP), or an application specific integrated circuit (ASIC), and performs various calculation processes or control processes according to various programs stored in the storage unit 30. Particularly, the processing unit 20 receives sensing data from the inertial measurement unit 10, and receives GPS data from the GPS unit 50, so as to estimate a walking velocity of the user by using the sensing data and the GPS data. The processing unit 20 calculates a velocity, a position, an attitude angle, and the like of the user by using the sensing data and the GPS data, and performs various calculation processes by using the calculated information so as to analyze exercise of the user and to generate exercise analysis information (image data, text data, sound data, and the like) including a movement path or a movement time period. The processing unit 20 transmits the generated exercise analysis information to the display apparatus 3 via the communication unit 40.

The storage unit 30 is constituted of, for example, recording media including various IC memories such as a read only memory (ROM), a flash ROM, and a random access memory (RAM), a hard disk, and a memory card.

Figure 9:
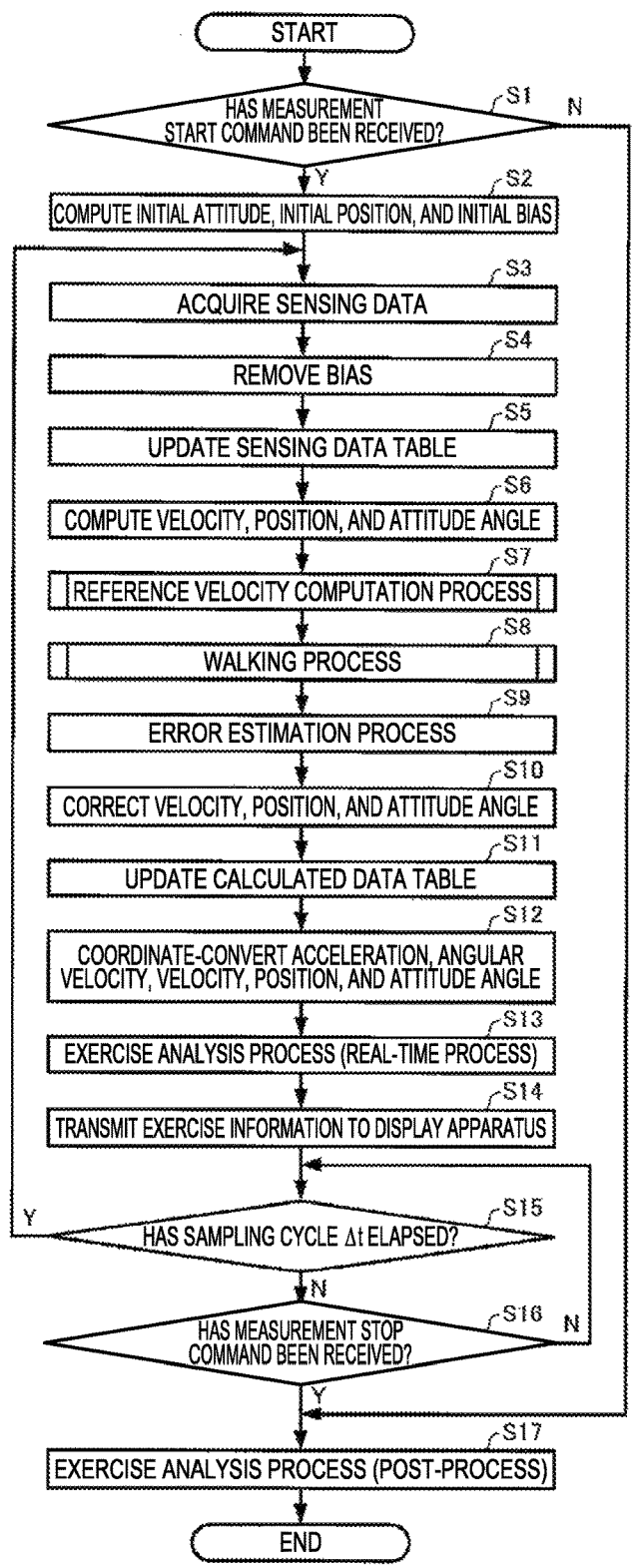
FIG. 9 is a flowchart illustrating examples of procedures of an exercise analysis process.

The storage unit 30 stores an exercise analysis program 300 which is read by the processing unit 20 and is used to perform an exercise analysis process (refer to FIG. 9). The exercise analysis program 300 includes, as sub-routines, a reference velocity computation program 301 for executing a reference velocity computation process (refer to FIG. 10) and a walking processing program 302 for executing a walking process (refer to FIG. 11).

The storage unit 30 stores a sensing data table 310, a GPS data table 320, a calculated data table 330, exercise analysis information 340, and the like.

The sensing data table 310 is a data table which stores sensing data (a detection result in the inertial measurement unit 10) received by the processing unit 20 from the inertial measurement unit 10 in a time series. FIG. 3 is a diagram illustrating a configuration example of the sensing data table 310. As illustrated in FIG. 3, the sensing data table 310 is configured so that sensing data items in which the detection time 311 in the inertial measurement unit 10, an acceleration 312 detected by the acceleration sensor 12, and an angular velocity 313 detected by the angular velocity sensor 14 are correlated with each other are arranged in a time series. When measurement is started, the processing unit 20 adds new sensing data to the sensing data table 310 whenever a sampling cycle Δt (for example, 20 ms) elapses. The processing unit 20 corrects an acceleration bias and an angular velocity bias which are estimated according to error estimation (which will be described later) using the Kalman filter, and updates the sensing data table 310 by overwriting the corrected acceleration and angular velocity to the sensing data table.

The GPS data table 320 is a data table which stores GPS data (a detection result in the GPS unit (GPS sensor) 50) received by the processing unit 20 from the GPS unit 50 in a time series. FIG. 4 is a diagram illustrating a configuration example of the GPS data table 320. As illustrated in FIG. 4, the GPS data table 320 is configured so that GPS data items in which the positioning time point 321 at which the GPS unit 50 performs positioning computation, a position 322 calculated through the positioning computation, a velocity 323 calculated through the positioning computation, positioning accuracy (dilution of precision (DOP)) 324, a signal intensity 325 of a received GPS satellite signal, and the like are correlated with each other are arranged in a time series. When measurement is started, the processing unit 20 adds new GPS data whenever the GPS data is acquired (for example, in an asynchronous manner with acquisition timing of sensing data) so as to update the GPS data table 320.

The calculated data table 330 is a data table which stores a velocity, a position, and an attitude angle calculated by the processing unit 20 by using the sensing data in a time series. FIG. 5 is a diagram illustrating a configuration example of the calculated data table 330. As illustrated in FIG. 5, the calculated data table 330 is configured so that calculated data items in which the time point 331 at which the processing unit 20 performs computation, a velocity 332, a position 333, and an attitude angle 334 are correlated with each other are arranged in a time series. When measurement is started, the processing unit 20 calculates a velocity, a position, and an attitude angle whenever new sensing data is acquired, that is, the sampling cycle Δt elapses, and adds new calculated data to the calculated data table 330. The processing unit 20 corrects a velocity, a position, and an attitude angle by using a velocity error, a position error, and an attitude angle error which are estimated according to error estimation using the Kalman filter, and updates the calculated data table 330 by overwriting the corrected velocity, position and attitude angle to the calculated data table.

Referring to FIG. 2 again, the exercise analysis information 340 is various information pieces regarding the exercise of the user, and, in the present embodiment, includes information regarding movement due to walking, information regarding an evaluation index of walking exercise, and information regarding advice, an instruction, and a warning for walking, calculated by the processing unit 20.

The communication unit 40 performs data communication with a communication unit 140 of the display apparatus 3, and performs a process of receiving exercise analysis information generated by the processing unit 20 and transmitting the exercise analysis information to the display apparatus 3, a process of receiving a command (a command for starting or finishing measurement, or the like) transmitted from the display apparatus 3 and sending the command to the processing unit 20, and the like.

The display apparatus 3 includes a processing unit 120, a storage unit 130, the communication unit 140, an operation unit 150, a clocking unit 160, a display unit 170, and a sound output unit 180. However, the display apparatus 3 of the present embodiment may have a configuration in which some of the constituent elements are deleted or changed, or other constituent elements may be added thereto.

The processing unit 120 performs various calculation processes or control processes according to a program stored in the storage unit 130. For example, the processing unit 120 performs various processes (a process of sending a command for starting or finishing measurement to the communication unit 140, a process of performing display or outputting sound corresponding to the operation data, and the like) corresponding to operation data received from the operation unit 150; a process of receiving exercise analysis information from the communication unit 140 and sending the exercise analysis information to the display unit 170 or the sound output unit 180; a process of generating time image data corresponding to time information received from the clocking unit 160 and sending the time image data to the display unit 170; and the like.

The storage unit 130 is constituted of various IC memories such as a ROM which stores a program or data required for the processing unit 120 to perform various processes, and a RAM serving as a work area of the processing unit 120.

The communication unit 140 performs data communication with the communication unit 40 of the exercise analysis apparatus 2, and performs a process of receiving a command (a command for starting or finishing measurement, or the like) corresponding to operation data from the processing unit 120 and transmitting the command to the exercise analysis apparatus 2, a process of receiving exercise analysis information (image data, text data, sound data, and the like) transmitted from the exercise analysis apparatus 2 and sending the information to the processing unit 120, and the like.

The operation unit 150 performs a process of acquiring operation data (operation data such as starting or finishing of measurement or selection of display content) from the user and sending the operation data to the processing unit 120. The operation unit 150 may be, for example, a touch panel type display, a button, a key, or a microphone.

The clocking unit 160 performs a process of generating time information such as year, month, day, hour, minute, and second. The clocking unit 160 is implemented by, for example, a real time clock (RTC) IC.

The display unit 170 displays image data or text data sent from the processing unit 120 as text, a graph, a table, animation, or other images. The display unit 170 is implemented by, for example, a display such as a liquid crystal display (LCD), an organic electroluminescence (EL) display, or an electrophoretic display (EPD), and may be a touch panel type display. A single touch panel type display may realize functions of the operation unit 150 and the display unit 170.

The sound output unit 180 outputs sound data sent from the processing unit 120 as sound such as voice or buzzer sound. The sound output unit 180 is implemented by, for example, a speaker or a buzzer.

Figure 6:
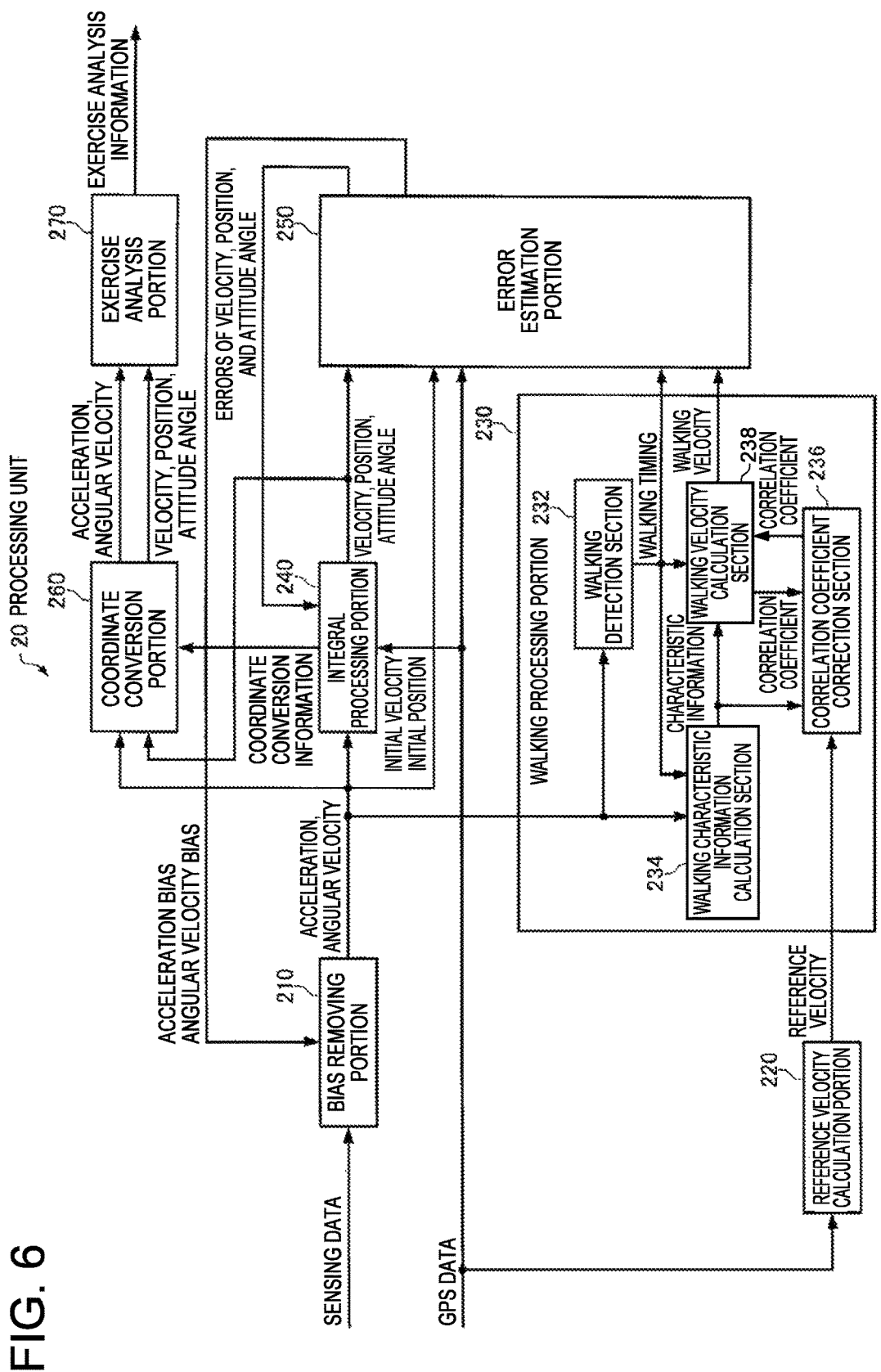
FIG. 6 is a functional block diagram illustrating a configuration example of a processing unit of the exercise analysis apparatus.

FIG. 6 is a functional block diagram illustrating a configuration example of the processing unit 20 of the exercise analysis apparatus 2. In the present embodiment, the processing unit 20 functions as a bias removing portion 210, a reference velocity calculation portion 220, a walking processing portion 230, an integral processing portion 240, an error estimation portion 250, a coordinate conversion portion 260, and an exercise analysis portion 270, by executing the exercise analysis program 300 stored in the storage unit 30.

The bias removing portion 210 subtracts an acceleration bias $b_a$ and an angular velocity bias $b_\omega$ estimated by the error estimation portion 250 from accelerations (three-axis accelerations) and angular velocities included in acquired new sensing data, so as to perform a process of correcting the accelerations and the angular velocities. Since the acceleration bias $b_a$ and the angular velocity bias $b_\omega$ are not present in an initial state right after measurement is started, the bias removing portion 210 computes initial biases by using sensing data from the inertial measurement unit assuming that an initial state of the user is a stationary state.

The reference velocity calculation portion 220 performs a process of calculating a reference velocity by using acquired GPS data (a detection result in the GPS unit 50). The GPS data includes a velocity obtained through positioning computation, but the velocity includes an error corresponding to a positioning error of the GPS, and thus reliability thereof may be low. Therefore, in the present embodiment, a difference between two positions obtained through positioning computation is divided by a difference between two positioning time points by using two most recently obtained GPS data items, and thus a reference velocity is calculated. In the above-described manner, errors of the two positions are canceled out, and thus the accuracy of the reference velocity can be improved.

The walking processing portion 230 includes a walking detection section 232, a walking characteristic information calculation section 234, a correlation coefficient correction section 236, and a walking velocity calculation section 238, and performs a process of detecting a walking cycle (walking timing) of the user or a process of calculating a walking velocity by using the acceleration or the angular velocity corrected by the bias removing portion 210 or the reference velocity calculated by the reference velocity calculation portion 220.

The walking detection section 232 performs a process of detecting a walking cycle of the user (walking timing) by using a detection result (specifically, sensing data corrected by the bias removing portion 210) in the inertial measurement unit 10.

Figure 7:
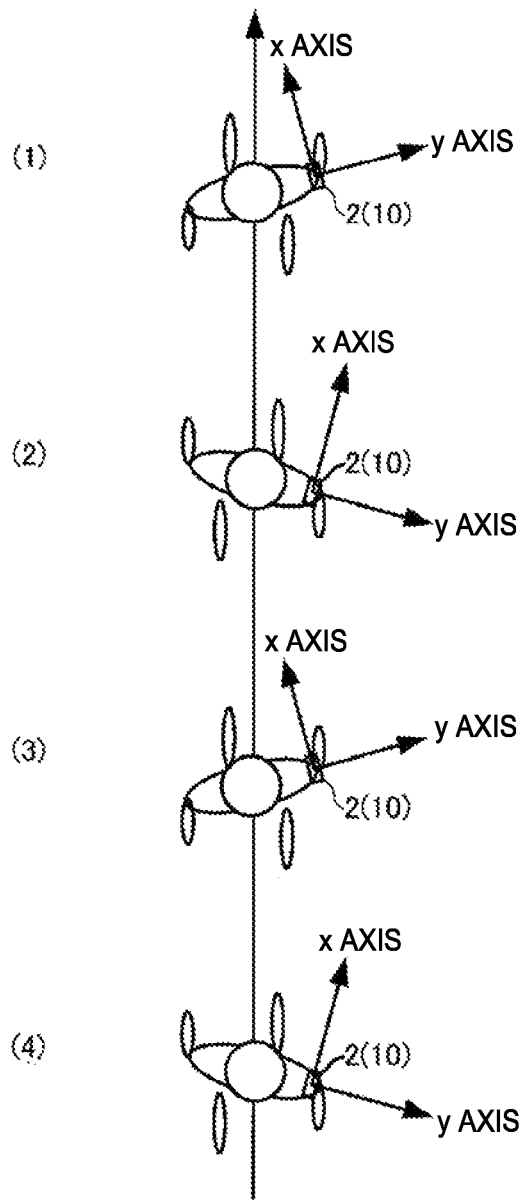
FIG. 7 is a diagram illustrating an attitude during a user's walking.

FIG. 7 is an overhead view of movement of the user in a case where the user wearing the exercise analysis apparatus 2 on the user's right waist performs a walking action. An attitude of the inertial measurement unit 10 relative to the user changes at any time due to the walking action of the user. In a state in which the user takes a step forward with the right foot, as illustrated in (2) or (4) of FIG. 7, the inertial measurement unit 10 is tilted to the left side with respect to the advancing direction (the x axis of the m frame). In contrast, in a state in which the user takes a step forward with the left foot, as illustrated in (1) or (3) of FIG. 7, the inertial measurement unit 10 is tilted to the right side with respect to the advancing direction (the x axis of the m frame). In other words, an attitude of the inertial measurement unit 10 periodically changes due to the walking action of the user. An acceleration measured by the inertial measurement unit 10 also periodically changes according to the periodical change in the attitude of the inertial measurement unit 10.

Figure 8:
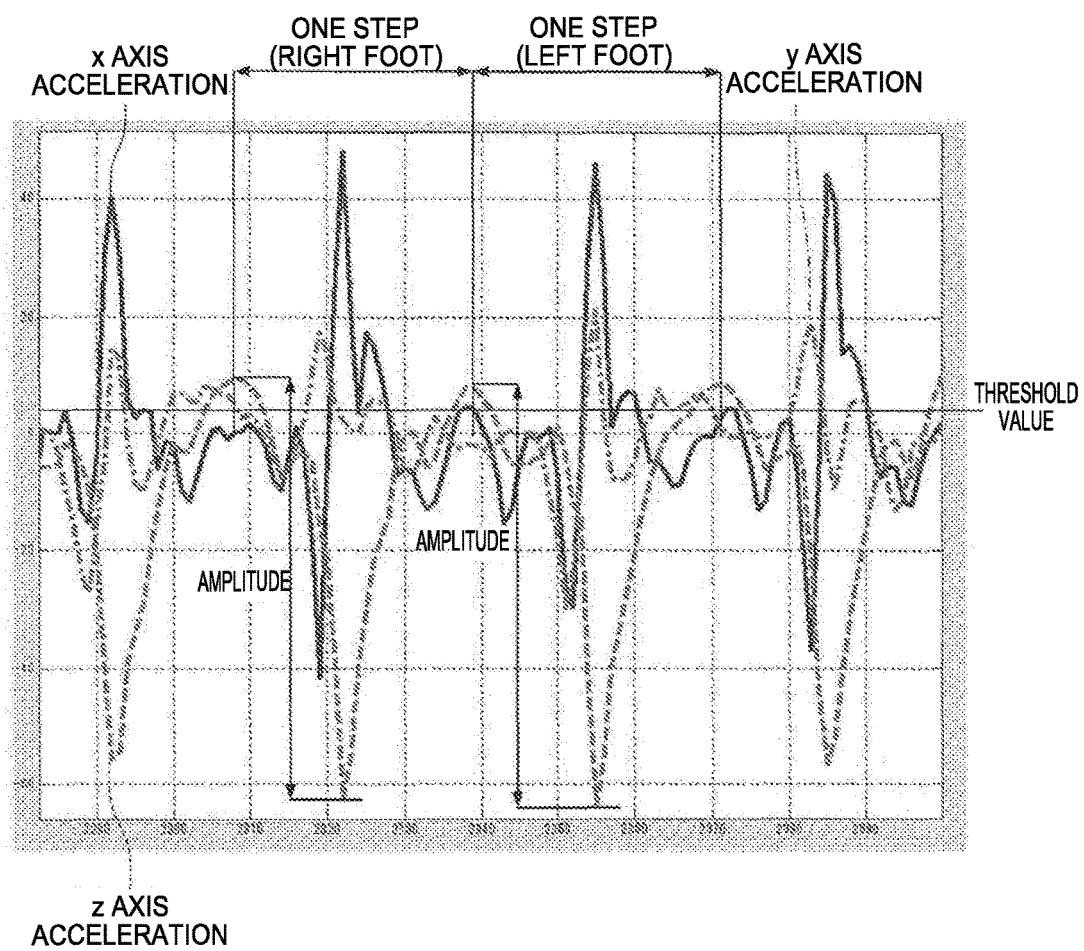
FIG. 8 is a diagram illustrating examples of three-axis accelerations during the user's walking.

FIG. 8 is a diagram illustrating examples of three-axis accelerations detected by the inertial measurement unit 10 during the user's walking. In FIG. 8, a transverse axis expresses time, and a longitudinal axis expresses an acceleration value. As illustrated in FIG. 8, the three-axis accelerations periodically change, and, particularly, it can be seen that the z axis (the axis in the gravitational direction) acceleration changes periodically and regularly. The z axis acceleration reflects an acceleration obtained when the user moves vertically, and a time period from the time at which the z axis acceleration becomes the maximum value which is equal to or greater than a predetermined threshold value to the time at which the z axis acceleration becomes the maximum value which is equal to or greater than the predetermined threshold value next corresponds to a time period of one step. The time period of one step is a walking cycle. A walking cycle (a walking cycle of the right foot) of one step in a state in which the user takes a step forward with the right foot and a walking cycle (a walking cycle of the left foot) of one step in a state in which the user takes a step forward with the left foot are alternately taken in a repeated manner.

Therefore, in the present embodiment, the walking detection section 232 detects a walking timing (walking cycle) when the z axis acceleration (corresponding to a vertical movement acceleration of the user) detected by the inertial measurement unit 10 becomes the maximum value which is equal to or greater than the predetermined threshold value. However, actually, since a high frequency noise component is included in the z axis accelerations detected by the inertial measurement unit 10, the walking detection section 232 applies a low-pass filter to the z axis accelerations, and detects a walking timing (walking cycle) by using a z axis acceleration from which noise is removed.

Referring to FIG. 6 again, the walking characteristic information calculation section 234 performs a process of calculating walking characteristic information of the user in synchronization with the walking timing (walking cycle) detected by the walking detection section 232 by using a detection result (specifically, sensing data corrected by the bias removing portion 210) in the inertial measurement unit 10. Here, as illustrated in FIG. 7, in a state in which the user takes a step forward with the right foot and a state in which the user takes a step forward with the left foot, an attitude of the inertial measurement unit 10 greatly changes, but a waveform of the z axis acceleration does not greatly change as illustrated in FIG. 8. As illustrated in FIG. 8, if a difference between the maximum value and the minimum value of the z axis acceleration in each walking cycle is defined as the amplitude of the z axis acceleration, it can be seen that the amplitude (amp) of the z axis acceleration and the walking velocity (v) have a high correlation coefficient, and a correlation expression indicating the correlation can be approximated to a linear expression as in Equation (1). In Equation (1), ParamA is a first-order correlation coefficient, and ParamB is a zero-th order coefficient.

[Expression 1]

$$v = ParamA \times amp + ParamB \quad (1)$$

In the present embodiment, the walking characteristic information calculation section 234 calculates the amplitude of a vertical movement acceleration (an acceleration in the z axis direction of the m frame) of the user in a walking cycle as the walking characteristic information.

The correlation coefficient correction section 236 performs a process of correcting the correlation coefficients (ParamA and ParamB) in the correlation expression (Equation (1)) indicating a correlation between the walking characteristic information (the amplitude amp of the z axis acceleration) calculated by the walking characteristic information calculation section 234 and the walking velocity v of the user by using the reference velocity calculated by the reference velocity calculation portion 220. In the present embodiment, the correlation coefficient correction section 236 corrects the correlation coefficients ParamA and ParamB by using the Kalman filter. In other words, a state vector X is defined as in Equation (2) by using ParamA and ParamB as state variables of the Kalman filter.

[Expression 2]

$$X = \begin{bmatrix} ParamA \\ ParamB \end{bmatrix} \quad (2)$$

The prediction formulae of the Kalman filter are expressed as in Equation (3). In Equation (3), the matrix F is a matrix which associates the previous state vector with the present state vector, and is assumed to be a unit matrix of 2×2 as shown in Equation (4) in the present embodiment. In Equation (3), Q is a matrix indicating process noise, and each element thereof is set to an appropriate value. P is an error covariance matrix of the state variables. Equation (3) indicates that the present state vector is predicted to be the same as the previous state vector, and that the present error covariance matrix P increases by the process noise Q more than the previous error covariance matrix.

[Expression 3]

$$X = FX$$

$$P = FPF^T + Q \quad (3)$$

[Expression 4]

$$F = \begin{bmatrix} 1 & 0 \\ 0 & 1 \end{bmatrix} \quad (4)$$

Update formulae of the Kalman filter are expressed as in Equation (5). In the present embodiment, the reference velocity calculated by using the GPS data in the reference velocity calculation portion 220 is used as an observation vector Z. H is an observation matrix and is expressed as in Equation (6). Therefore, in a case where a velocity vector obtained by using the correlation expression (1) is the same as a GPS velocity vector, this leads to Z−HX=0, and thus an updated state vector X is the same as predicted. R is a covariance matrix of observation errors, and is dynamically changed so as to have a larger value as positioning accuracy included in GPS data becomes lower (a DOP value becomes greater). K is a Kalman gain, and K increases as R decreases. From Equation (5), as K increases (R decreases), a difference (correction amount) between an updated state vector X and a predicted state vector increases, and thus P decreases.

[Expression 5]

$$K = PH^T(HPH^T + R)^{-1}$$

$$X = X + K(Z - HX)$$

$$P = (I - KH)P \quad (5)$$

[Expression 6]

$$H = [\text{amp } 1] \quad (6)$$

The walking velocity calculation section 238 performs a process of calculating the walking velocity (v) by assigning the walking characteristic information (the amplitude amp of the z axis acceleration) and the corrected coefficients (ParamA and ParamB) corrected by the correlation coefficient correction section 236 to the correlation expression (1) in synchronization with the walking timing (walking cycle) detected by the walking detection section 232. Before the correlation coefficient correction section 236 performs correction, the corrected coefficients (ParamA and ParamB) are set to defined values obtained through statistics or the like, and the walking velocity calculation section 238 calculates the walking velocity (v) by assigning the defined values to the correlation expression (1).

The integral processing portion 240 performs a process of calculating a velocity $v^e$, a position $p^e$, and attitude angles (a roll angle $\phi_{be}$, a pitch angle $\theta_{be}$, and a yaw angle $\psi_{be}$) of the e frame on the basis of the accelerations and the angular velocities corrected by the bias removing portion 210. Specifically, first, the integral processing portion 240 sets an initial velocity to zero assuming that an initial state of the user is a stationary state, or calculates an initial velocity by using the velocity included in the GPS data and also calculates an initial position by using the position included in the GPS data. The integral processing portion 240 specifies a gravitational acceleration direction on the basis of the three-axis accelerations of the b frame corrected by the bias removing portion 210 so as to calculate initial values of the roll angle $\phi_{be}$ and the pitch angle $\theta_{be}$, also calculates an initial value of the yaw angle $\psi_{be}$ on the basis of the velocity including the GPS data, and sets the calculated initial values as initial attitude angles of the e frame. In a case where the GPS data cannot be obtained, an initial value of the yaw angle $\psi_{be}$ is set to, for example, zero. The integral processing portion 240 calculates an initial value of a coordinate conversion matrix (rotation matrix) $C_b^e$ from the b frame into the e frame, expressed by Equation (7) on the basis of the calculated initial attitude angles.

[Expression 7]

$$C_b^e = \begin{bmatrix} \cos\theta_{be} \cos\varphi_{be} & \cos\theta_{be} \cdot \sin\varphi_{be} & -\sin\theta_{be} \\ \sin\phi_{be} \cdot \sin\theta_{be} \cdot \cos\varphi_{be} - \cos\phi_{be} \cdot \sin\varphi_{be} & \sin\phi_{be} \cdot \sin\theta_{be} \cdot \sin\varphi_{be} + \cos\phi_{be} \cdot \cos\varphi_{be} & \sin\phi_{be} \cdot \cos\theta_{be} \\ \cos\phi_{be} \cdot \sin\theta_{be} \cdot \cos\varphi_{be} + \sin\phi_{be} \cdot \sin\varphi_{be} & \cos\phi_{be} \cdot \sin\theta_{be} \cdot \sin\varphi_{be} - \sin\phi_{be} \cdot \cos\varphi_{be} & \cos\phi_{be} \cdot \cos\theta_{be} \end{bmatrix} \quad (7)$$

Then, the integral processing portion 240 performs integration (rotation calculation) of the three-axis angular velocities corrected by the bias removing portion 210 so as to calculate the coordinate conversion matrix $C_b^e$, and calculates attitude angles by using Equation (8).

[Expression 8]

$$\begin{bmatrix} \phi_{be} \\ \theta_{be} \\ \varphi_{be} \end{bmatrix} = \begin{bmatrix} \arctan2(C_b^e(2,3), C_b^e(3,3)) \\ -\arcsin C_b^e(1,3) \\ \arctan2(C_b^e(1,2), C_b^e(1,1)) \end{bmatrix} \quad (8)$$

The integral processing portion 240 converts the three-axis accelerations of the b frame corrected by the bias removing portion 210 into three-axis accelerations of the e frame by using the coordinate conversion matrix $C_b^e$, and removes an gravitational acceleration component therefrom for integration so as to calculate the velocity $v^e$ of the e frame. The integral processing portion 240 integrates the velocity $v^e$ of the e frame so as to calculate the position $p^e$ of the e frame.

The integral processing portion 240 also performs a process of correcting the velocity $v^e$, the position $p^e$, and the attitude angles by using a velocity error $\delta v^e$, a position error $\delta p^e$, and attitude angle errors $\epsilon^e$ estimated by the error estimation portion 250.

The integral processing portion 240 also calculates a coordinate conversion matrix $C_b^m$ from the b frame into the m frame, and a coordinate conversion matrix $C_e^m$ from the e frame into the m frame. The coordinate conversion matrices are used for a coordinate conversion process in the coordinate conversion portion 260 which will be described later as coordinate conversion information.

The error estimation portion 250 estimates an error of an index indicating a state of the user by using the walking velocity of the user calculated by the walking velocity calculation section 238, the velocity and/or the position, and the attitude angles calculated by the integral processing portion 240, the acceleration or the angular velocity corrected by the bias removing portion 210, the GPS data, and the like. In the present embodiment, the error estimation portion 250 uses the velocity, the attitude angles, the acceleration, the angular velocity, and the position as indexes indicating a state of the user, and estimates errors of the indexes by using the extended Kalman filter. In other words, the error estimation portion 250 uses an error (velocity error) $\delta v^e$ of the velocity $v^e$ calculated by the integral processing portion 240, errors (attitude angle errors) $\varepsilon^e$ of the attitude angles calculated by the integral processing portion 240, the acceleration bias $b_a$, the angular velocity bias $b_\omega$, and an error (position error) $\delta p^e$ of the position $p^e$ calculated by the integral processing portion 240, as state variables of the extended Kalman filter, and the state vector X is defined as in Equation (9).

[Expression 9]

$$X = \begin{bmatrix} \delta v^e \\ \varepsilon^e \\ b_a \\ b_\omega \\ \delta p^e \end{bmatrix} \quad (9)$$

Prediction formulae of the extended Kalman filter are expressed as in Equation (10). In Equation (10), the matrix $\Phi$ is a matrix which associates the previous state vector X with the present state vector X, and is designed so that some elements thereof change every moment while reflecting attitude angles, a position, and the like. Q is a matrix indicating process noise, and each element thereof is set to an appropriate value. P is an error covariance matrix of the state variables.

[Expression 10]

$$X = \Phi X$$

$$P = \Phi P \Phi^T + Q \quad (10)$$

Update formulae of the extended Kalman filter are expressed as in Equation (11). Z and H are respectively an observation vector and an observation matrix, and the update formulae (11) indicate that the state vector X is corrected by using a difference between the actual observation vector Z and a vector HX predicted from the state vector X. R is a covariance matrix of observation errors, and may have predefined constant values, and may be dynamically changed. K is a Kalman gain, and K increases as R decreases. From Equation (11), as K increases (R decreases), a correction amount of the state vector X increases, and thus P decreases.

[Expression 11]

$$K = PH^T(HPH^T + R)^{-1}$$

$$X = X + K(Z - HX)$$

$$P = (I - KH)P \quad (11)$$

An error estimation method (a method of estimating the state vector X) may include, for example, the following methods.

Error estimation method using correction based on attitude angle errors:

In this method, as described in FIG. 7, since an attitude of the user periodically (every two steps (including left and right steps)) changes during the user's walking, an error is estimated assuming that the previous (two steps before) attitude angle is the same as the present attitude angle, and the previous attitude angle is a true attitude angle. In this method, the observation vector Z is a difference between the previous attitude angle and the present attitude angle calculated by the integral processing portion 240, and the state vector X is corrected on the basis of a difference between the attitude angle error $\varepsilon^e$ and an observed value according to the update formulae (11) so that an error is estimated.

Error estimation method using correction based on the angular velocity bias:

This method is a method of estimating an error assuming that the previous (two steps before) attitude angle is the same as the present attitude angle, and the previous attitude angle is not required to be a true attitude angle. In this method, the observation vector Z is an angular velocity bias calculated on the basis of the previous attitude angle and the present attitude angle, calculated by the integral processing portion 240, and the state vector X is corrected on the basis of a difference between the angular velocity bias $b_\omega$ and an observed value according to the update formulae (11), so that an error is estimated.

Error estimation method using correction based on azimuth angle error:

This method is a method of estimating an error assuming that the previous (two steps before) yaw angle (azimuth angle) is the same as the present yaw angle (azimuth angle), and the previous yaw angle (azimuth angle) is a true yaw angle (azimuth angle). In this method, the observation vector Z is a difference between the previous yaw angle and the present yaw angle calculated by the integral processing portion 240, and the state vector X is corrected on the basis of a difference between an azimuth angle error $\varepsilon_z^e$ and an observed value according to the update formulae (11) so that an error is estimated.

Error estimation method using correction based on walking velocity:

This method is a method of estimating an error assuming that the velocity $v^e$ calculated by the integral processing portion 240 is the same as the walking velocity v calculated by the walking processing portion 230. In this method, the observation vector Z is a difference between the velocity calculated by the integral processing portion 240 and the walking velocity calculated by the walking processing portion 230, and the state vector X is corrected on the basis of the difference between the velocity error $\delta v^e$ and an observed value according to the update formulae (11) so that an error is estimated.

Error estimation method using correction based on stoppage:

This method is a method of estimating an error assuming that a velocity is zero when the user stops. In this method, the observation vector Z is a difference between a velocity $v^e$ calculated by the integral processing portion 240 and zero, and the state vector X is corrected on the basis of the velocity error $\delta v^e$ according to the update formulae (11) so that an error is estimated.

Error estimation method using correction based on standing still:

This method is a method of estimating an error assuming that a velocity is zero and an attitude change is also zero when the user stands still. In this method, the observation vector Z is an error of the velocity $v^e$ calculated by the integral processing portion 240 and a difference between the previous attitude angle and the present attitude angle calculated by the integral processing portion 240, and the state vector X is corrected on the basis of the velocity error $\delta v^e$ and the attitude angle error $\varepsilon^e$ according to the update formulae (11) so that an error is estimated.

Error estimation method using correction based on observed value of GPS:

This method is a method of estimating an error assuming that the velocity $v^e$, the position $p^e$, or the yaw angle $\psi_{be}$ calculated by the integral processing portion 240 is the same as a velocity, a position, or an azimuth angle (a velocity, a position, or an azimuth angle after being converted into the e frame) which is calculated by using GPS data. In this method, the observation vector Z is a difference between a velocity, a position, or a yaw angle calculated by the integral processing portion 240 and a velocity, a positional velocity, or an azimuth angle calculated by using the GPS data, and the state vector X is corrected on the basis of a difference between the velocity error $\delta v^e$, the position error $\delta p^e$, or the azimuth angle errors $\varepsilon_z^e$, and an observed value according to the update formulae (11) so that an error is estimated.

In the present embodiment, the error estimation portion 250 creates the observation vector Z and the observation matrix H to which at least the "error estimation method using correction based on walking velocity" is applied, and some or all of the other error estimation methods are further applied, and estimates the state vector X by using the extended Kalman filter.

The coordinate conversion portion 260 performs a coordinate conversion process of converting the accelerations and the angular velocities of the b frame corrected by the bias removing portion 210 into accelerations and angular velocities of the m frame, respectively, by using the coordinate conversion information (coordinate conversion matrix $C_b^m$) from the b frame into the m frame, calculated by the integral processing portion 240. The coordinate conversion portion 260 performs a coordinate conversion process of converting the velocities, the position, and the attitude angles of the e frame calculated by the integral processing portion 240 into velocities, a position, and attitude angles of the m frame, respectively, by using the coordinate conversion information (coordinate conversion matrix $C_e^m$) from the e frame into the m frame, calculated by the integral processing portion 240.

The exercise analysis portion 270 performs a process of various calculations by using the accelerations, the angular velocities, the velocities, the position, and the attitude angles of the m frame obtained through coordinate conversion in the coordinate conversion portion 260, so as to analyze the user's exercise and to generate the exercise analysis information 340. In the present embodiment, the exercise analysis portion 270 generates the exercise analysis information 340 including information regarding movement such as a movement path, a movement velocity, and a movement time, information regarding an evaluation index of walking exercise such as the extent of forward tilt, a difference between left and right motions, propulsion efficiency, an amount of energy consumption, and energy efficiency, information regarding advice or an instruction for better walking, warning information (information for causing the display apparatus 3 to output warning display or warning sound) indicating that an attitude is bad, and the like.

The processing unit 20 transmits the exercise analysis information 340 to the display apparatus 3, and the exercise analysis information 340 is displayed on the display unit 170 of the display apparatus 3 as text, images, graphics, or the like, or is output as voice or buzzer sound from the sound output unit 180. Fundamentally, the exercise analysis information 340 is displayed on the display unit 170, and thus the user can view the display unit 170 and check the exercise analysis information when the user wants to know the exercise analysis information. Information (warning information) which is desired to attract the user's attention is output as at least sound, and thus the user is not required to walk while normally viewing the display unit 170.

1-4. Procedure of Process

FIG. 9 is a flowchart illustrating examples (an example of an exercise analysis method) of procedures of the exercise analysis process performed by the processing unit 20. The processing unit 20 performs the exercise analysis process according to the procedures of the flowchart illustrated in FIG. 9 by executing the exercise analysis program 300 stored in the storage unit 30.

As illustrated in FIG. 9, if a command for starting measurement has been received (Y in step S1), first, the processing unit 20 computes an initial attitude, an initial position, and an initial bias by using sensing data and GPS data measured by the inertial measurement unit 10 assuming that the user stands still (step S2).

Next, the processing unit 20 acquires the sensing data from the inertial measurement unit 10, and adds the acquired sensing data to the sensing data table 310 (step S3).

Next, the processing unit 20 removes biases from acceleration and angular velocity included in the sensing data acquired in step S3 by using the initial bias (by using the acceleration bias $b_a$ and an angular velocity bias $b_\omega$ after the acceleration bias $b_a$ and the angular velocity bias $b_\omega$ are estimated in step S9) so as to correct the acceleration and the angular velocity (step S4), and updates the sensing data table 310 by using the acceleration and angular velocity corrected in step S4 (step S5).

Next, the processing unit 20 integrates the sensing data corrected in step S4 so as to compute a velocity, a position, and an attitude angle, and adds calculated data including the computed velocity, position, and attitude angle to the calculated data table 330 (step S6).

Next, the processing unit 20 performs a reference velocity computation process (step S7) so as to calculate a reference velocity, and also performs a walking process (step S8) so as to calculate a walking cycle (walking timing) and a walking velocity. Examples (an example of a correlation coefficient correction method) of procedures of the reference velocity computation process (step S7) and walking process (step S8) will be described later.

Next, the processing unit 20 performs an error estimation process by using the extended Kalman filter (step S9), so as to estimate a velocity error $\delta v^e$, an attitude angle error $\varepsilon^e$, an acceleration bias $b_a$, an angular velocity bias $b_\omega$, and a position error $\delta p^e$.

Next, the processing unit 20 corrects the velocity, the position, and the attitude angle by using the velocity error $\delta v^e$, the attitude angle error $\varepsilon^e$, and the position error $\delta p^e$ calculated in step S9 (step S10), and updates the calculated data table 330 by using the velocity, position, and the attitude angle corrected in step S10 (step S11).

Next, the processing unit 20 performs coordinate conversion of the sensing data (the acceleration and the angular velocity of the b frame) stored in the sensing data table 310 and the calculated data (the velocity, the position, and the attitude angle of the e frame) stored in the calculated data table 330 into acceleration, angular velocity, velocity, a position, and an attitude angle of the m frame (step S12). The processing unit 20 stores the acceleration, the angular velocity, the velocity, the position, and the attitude angle of the m frame in the storage unit 30 in a time series.

Next, the processing unit 20 analyzes the user's exercise in real time by using the acceleration, the angular velocity, the velocity, the position, and the attitude angle of the m frame obtained through the coordinate conversation in step S12, so as to generate exercise analysis information (step S13).

Next, the processing unit 20 transmits the exercise analysis information generated in step S13 to the display apparatus 3 (step S14). The exercise analysis information transmitted to the display apparatus 3 is fed back in real time during the user's walking. In the present specification, the "real time" indicates that processing is started at a timing at which processing target information is acquired. Therefore, the "real time" also includes some time difference between acquisition of information and completion of processing of the information.

The processing unit 20 repeatedly performs the processes in step S3 and the subsequent steps whenever the sampling cycle Δt elapses (Y in step S15) from the acquisition of the previous sensing data until a command for finishing the measurement has been received (N in step S15 and N in step S16). If the command for finishing the measurement has been received (Y in step S16), the processing unit analyzes an exercise performed by the user by using the acceleration, the angular velocity, the velocity, the position, and the attitude angle of the m frame which are obtained through the coordinate conversion in step S12 and are stored in a time series, or the analysis result in step S13, so as to generate exercise analysis information (step S17). If the command for finishing the measurement has been received, in step S17, the processing unit 20 may immediately perform the exercise analysis process, and may perform the exercise analysis process in a case where an exercise analysis command has been received through a user's operation. The processing unit 20 may transmit the exercise analysis information generated in step S17 to the display apparatus 3, may transmit the exercise analysis information to an apparatus such as a personal computer or a smart phone, and may record the exercise analysis information in a memory card.

In FIG. 9, if a command for starting measurement has not been received (N in step S1), the processing unit 20 does not perform the processes in steps S1 to S17, but may perform the process in step S17 by using the acceleration, the angular velocity, the velocity, the position, and the attitude angle of the m frame stored in the past, or the analysis result in step S13.

Figure 10:
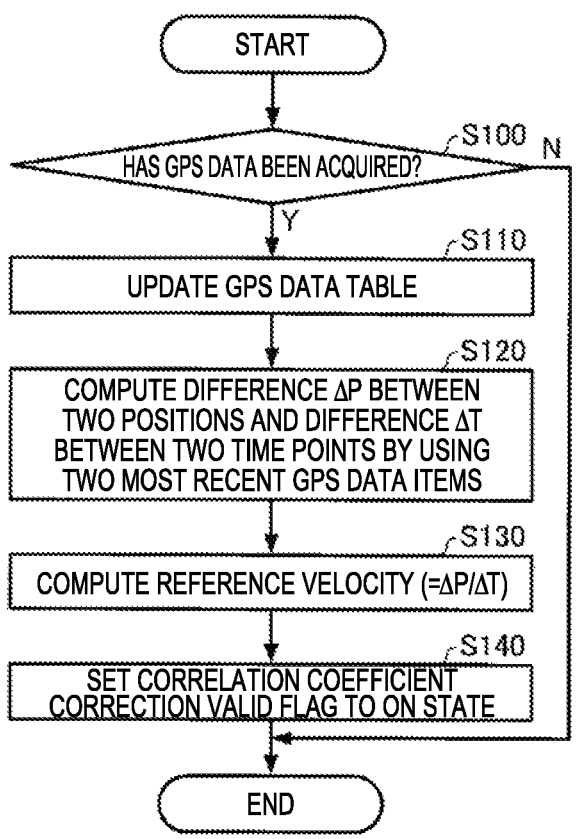
FIG. 10 is a flowchart illustrating examples of procedures of a reference velocity computation process.

FIG. 10 is a flowchart illustrating examples of procedures of the reference velocity computation process (process in step S7 in FIG. 9). The processing unit 20 (reference velocity calculation portion 220) performs the reference velocity computation process according to the procedures of the flowchart illustrated in FIG. 10 by executing the reference velocity computation program 301 stored in the storage unit 30.

As illustrated in FIG. 10, in a case where new GPS data has been acquired (Y in step S100), the processing unit 20 adds the acquired GPS data so as to update the GPS data table 320 (step S110).

Next, the processing unit 20 computes a difference ΔP between two positions and a difference ΔT between two time points by using two most recent GPS data items included in the GPS data table 320 (step S120). For example, in a case where the first GPS data and the second GPS data in FIG. 4 are used as the two most recent GPS data items, this leads to ΔP=(Px2−Px1, Py2−Py1, Pz2−Pz1), and ΔT=T2−T1.

Next, the processing unit 20 divides ΔP computed in step S120 by ΔT so as to compute a reference velocity. For example, in a case where ΔP is ΔP=(Px2−Px1, Py2−Py1, Pz2−Pz1), and ΔT=T2−T1, the reference velocity is ((Px2−Px1)/(T2−T1), (Py2−Py1)/(T2−T1), (Pz2−Pz1)/(T2−T1)).

Finally, the processing unit 20 sets a correlation coefficient correction valid flag to an ON state (step S140), and finishes the reference velocity computation process. In a case where new GPS data has not been acquired (N in step S100), the processing unit 20 finishes the reference velocity computation process without performing the processes in step S110 and the subsequent steps.

Figure 11:
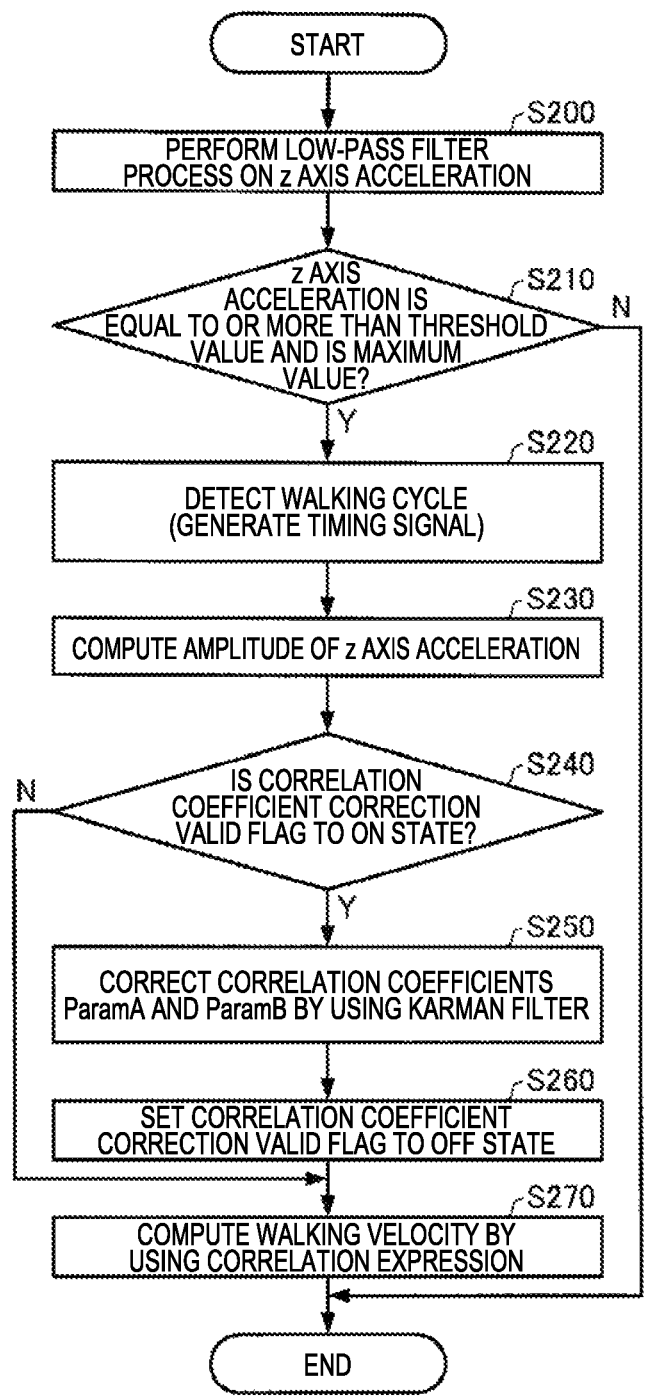
FIG. 11 is a flowchart illustrating examples of procedures of a walking process.

FIG. 11 is a flowchart illustrating examples of procedures of the walking process (process in step S8 in FIG. 9). The processing unit 20 (walking processing portion 230) performs the walking process according to the procedures of the flowchart illustrated in FIG. 11 by executing the walking processing program 302 stored in the storage unit 30.

As illustrated in FIG. 11, the processing unit 20 performs a low-pass filter process on a z axis acceleration included in the acceleration corrected in step S4 in FIG. 9 (step S200) so as to remove noise therefrom.

Next, in a case where the z axis acceleration having undergone the low-pass filter process in step S200 has a value which is equal to or greater than a threshold value and is the maximum value (Y in step S210), the processing unit 20 detects a walking cycle (generates a walking timing signal) (step S220).

Next, the processing unit 20 computes the amplitude amp (a difference between the maximum value and the minimum value) of the z axis acceleration included in the previous walking cycle (step S230).

Next, if the correlation coefficient correction valid flag is set to an ON state (Y in step S240), the processing unit 20 corrects the correlation coefficients (ParamA and ParamB) in the correlation expression (1) by using the Kalman filter (step S250), and sets the correlation coefficient correction valid flag to an OFF state (step S260).

Next, the processing unit 20 assigns the correlation coefficients ParamA and ParamB corrected in step S260 to the correlation expression (1) so as to compute a walking velocity v (step S270), and finishes the walking process.

On the other hand, if the correlation coefficient correction valid flag is set to an OFF state (N in step S240), the processing unit 20 assigns the correlation coefficients ParamA and ParamB to the correlation expression (1) without correcting the correlation coefficients so as to compute the walking velocity v (step S270), and finishes the walking process. If the z axis acceleration is less than the threshold value or is not the maximum value (N in step S210), and the processing unit 20 finishes the walking process without performing the processes in step S220 and the subsequent steps.

1-5. Effects

As described above, according to the present embodiment, the correlation coefficients in the correlation expression between the amplitude of the vertical movement acceleration (z axis acceleration) during the user's walking and the walking velocity are dynamically corrected by using the Kalman filter with a velocity calculated by using the GPS as a reference velocity, and thus it is possible to estimate the walking velocity with high accuracy by reflecting the user's physique or way of walking.

In the present embodiment, it is possible to correct information such as a velocity, a position, and attitude angle of the user by using errors which are estimated by using the extended Kalman filter with the walking velocity estimated with high accuracy as a reference. According to the present embodiment, it is possible to analyze the user's walking exercise with high accuracy by using the information such as the velocity, the position, and the attitude angle which are corrected with high accuracy.

In the present embodiment, since the correlation expression having, as a variable, the amplitude of the vertical movement acceleration having a high correlation with the walking velocity, is used, it is possible to further improve estimation accuracy of the walking velocity.

2. MODIFICATION EXAMPLES

The invention is not limited to the present embodiment, and may be variously modified within the scope of the invention. Hereinafter, modification examples will be described. The same constituent elements as those in the embodiments are given the same reference numerals, and repeated description will be omitted.

2-1. Sensor

In the above-described embodiments, the acceleration sensor 12 and the angular velocity sensor 14 are integrally formed as the inertial measurement unit 10 and are built into the exercise analysis apparatus 2, but the acceleration sensor 12 and the angular velocity sensor 14 may not be integrally formed. Alternatively, the acceleration sensor 12 and the angular velocity sensor 14 may not be built into the exercise analysis apparatus 2, and may be directly mounted on the user. In any case, for example, a sensor coordinate system of one sensor may be set to the b frame of the embodiment, the other sensor coordinate system may be converted into the b frame, and the embodiment may be applied thereto.

In the above-described respective embodiments, a part of which the sensor (the exercise analysis apparatus 2 (the IMU 10)) is mounted on the user has been described to be the waist, but the sensor may be mounted on parts other than the waist. A preferable mounting part is the user's trunk (parts other than the limbs). However, a mounting part is not limited to the trunk, and may be mounted on, for example, the user's head or leg other than the arms.

2-2. Correlation Expression

In the above-described embodiment, the correlation expression (1) between the amplitude amp of the vertical movement acceleration (z axis acceleration) as one of walking characteristic information of the user, and the walking velocity v, is used, but is not limited thereto, and, for example, a correlation expression between the amplitude of a combined acceleration of three-axis accelerations as one of the walking characteristic information of the user, and the walking velocity v, may be used.

Since a correlation is also present between an acceleration (a vertical movement acceleration, a combined acceleration, an advancing direction acceleration, or the like) and a stride, a correlation expression between the acceleration and the stride may be used. In this case, the correlation coefficient correction section 236 may calculate a reference stride by using a reference velocity calculated by the reference velocity calculation portion 220, and may correct a correlation coefficient by using the calculated reference stride. For example, the walking detection section 232 may compute a pitch (time period of a walking cycle) on the basis of a difference between two consecutive walking timings, and the correlation coefficient correction section 236 may calculate a reference stride by multiplying the pitch by the reference velocity, and may correct the correlation coefficient in the correlation expression between the acceleration and the stride by using the calculated reference stride as the observation vector Z. The correlation coefficient correction section 236 may correct a correlation coefficient in a correlation expression between a velocity obtained by integrating an acceleration, and a stride.

A multiple regression formula such as Equation (12) for obtaining a walking velocity or a stride may be used as a correlation expression, and correlation coefficients $a_0$, $a_1$ and $a_2$ may be corrected with, for example, a pitch (a time period of a walking cycle) as walking characteristic information of the user and a peak value of a combined acceleration as $x_1$ and $x_2$, respectively.

[Expression 12]

$$y = a_0 + a_1 x_1 + a_2 x_2 \tag{12}$$

2-3. Reference Velocity

In the above-described embodiment, the reference velocity calculation portion 220 obtains a difference between two positions and a difference between two time points by using two most recent GPS data items so as to compute a reference velocity, but is not limited thereto, and may obtain an average velocity by using three or more GPS data items so as to compute a reference velocity. In this case, velocities included in the GPS data items may be averaged without being changed, and an average velocity may be obtained by using a position and a time point.

In the above-described embodiment, the reference velocity calculation portion 220 computes a reference velocity in a case where GPS data has been acquired, but may calculate the reference velocity only in a case where positioning accuracy is equal to or more than a threshold value in a case where the GPS data has been acquired. Alternatively, the reference velocity calculation portion 220 may use a velocity included in the GPS data as a reference velocity if the positioning accuracy is equal to or more than the threshold value in a case where the GPS data has been acquired, may calculate a reference velocity by using a position and a time point if the positioning accuracy is less than the threshold value in a case where the GPS data has been acquired, or may obtain an average velocity so as to calculate a reference velocity.

In the above-described embodiment, the reference velocity calculation portion 220 calculates a reference velocity by using GPS data, but is not limited thereto, and may obtain a velocity of the user in the advancing direction by using, for example, outputs from the inertial measurement unit 10 (inertial sensor), so as to calculate a reference velocity.

In the above-described embodiment, the reference velocity calculation portion 220 may generate a reference velocity by using a signal from the GPS satellite, but may calculate a reference velocity angle by using a signal from a positioning satellite of a global navigation satellite system (GNSS) other than the GPS, or a positioning satellite other than the GNSS. For example, one, or two or more satellite positioning systems such as a wide area augmentation system (WAAS), a quasi zenith satellite system (QZSS), a global navigation satellite system (GLONASS), GALILEO, a BeiDou navigation satellite system (BeiDou) may be used. An indoor messaging system (IMES) may also be used.

2-4. Correction of Correlation Coefficient

In the above-described embodiment, in a case where the reference velocity calculation portion 220 calculates a new reference velocity, the correlation coefficient correction section 236 corrects a correlation coefficient regardless of the use of the reference velocity, but is not limited thereto, and the correlation coefficient correction section 236 may not correct the correlation coefficient in a case where positioning accuracy of GPS data which is a basis of calculation of the reference velocity is less than a threshold value (a DOP value is greater than the threshold value), or may correct the correlation coefficient by relatively increasing the covariance matrix R of an observation error.

In the above-described embodiments, the Kalman filter is used to correct a correlation coefficient in the correlation coefficient correction section 236, but other correction means such as a particle filter or an H∞ (H infinity) filter may be used.

2-5. Error Estimation

In the above-described embodiments, the error estimation portion 250 uses a velocity, an attitude angle, an acceleration, an angular velocity, and a position as indexes indicating a user's state, and estimates errors of the indexes by using the extended Kalman filter, but may estimate the errors thereof by using some of the velocity, the attitude angle, the acceleration, the angular velocity, and the position as indexes indicating a user's state. Alternatively, the error estimation portion 250 may estimate the errors thereof by using parameters (for example, a movement distance) other than the velocity, the attitude angle, the acceleration, the angular velocity, and the position as indexes indicating a user's state.

In the above-described embodiments, the extended Kalman filter is used to estimate an error in the error estimation portion 250, but other estimation means such as a particle filter or an H∞ (H infinity) filter may be used.

2-6. Walking Detection

In the above-described embodiment, the walking detection section 232 detects, as a walking timing, a timing at which the vertical movement acceleration (z axis acceleration) of the user becomes the maximum value which is equal to or greater than a threshold value, but is not limited thereto, and may detect, as a walking timing, a timing at which the vertical movement acceleration (z axis acceleration) crosses zero while changing from a positive value to a negative value (or a timing at which the z axis acceleration crosses zero while changing from a negative value to a positive value). Alternatively, the walking detection section 232 may integrate a vertical movement acceleration (z axis acceleration) so as to calculate a vertical movement velocity (z axis velocity), and may detect a walking cycle (walking timing) by using the calculated vertical movement velocity (z axis velocity). In this case, the walking detection section 232 may detect a walking cycle (walking timing), for example, at a timing at which the velocity crosses a threshold value near the median between the maximum value and the minimum value by increasing or decreasing a value.

In the above-described embodiment, the walking detection section 232 detects a walking cycle (walking timing) every step, but is not limited thereto. The walking detection section 232 may detect a walking cycle (walking timing) every two steps (including left and right steps), and the correlation coefficient correction section 236 may correct a correlation coefficient once every two steps in synchronization with the walking timing. Alternatively, the walking detection section 232 may detect a walking cycle (walking timing) every step and also may output a flag indicating the right foot or the left foot, and the correlation coefficient correction section 236 may hold a correlation expression (correlation coefficient) for the right foot and a correlation expression (correlation coefficient) for the left foot separately, and may correct either of the correlation expressions (correlation coefficients) according to the flag every walking cycle (walking timing).

2-7. Others

In the above-described embodiments, the integral processing portion 240 calculates a velocity, a position, and an attitude angle of the e frame, and the coordinate conversion portion 260 coordinate-converts the velocity, the position, and the attitude angle of the e frame into a velocity, a position, and an attitude angle of the m frame, but the integral processing portion 240 may calculates a velocity, a position, and an attitude angle of the m frame. In this case, the exercise analysis portion 270 may perform an exercise analysis process by using the velocity, the position, and the attitude angle of the m frame calculated by the integral processing portion 240, and thus coordinate conversion of a velocity, a position, and an attitude angle in the coordinate conversion portion 260 is not necessary. The error estimation portion 250 may perform error estimation based on the extended Kalman filter by using the velocity, the position, and the attitude angle of the m frame.

In the above-described embodiment, the processing unit 20 generates exercise analysis information such as image data, sound data, and text data, but is not limited thereto, and, for example, the processing unit 20 may transmit a calculation result of propulsion efficiency or an amount of energy consumption, and the processing unit 120 of the display apparatus 3 receiving the calculation result may create image data, sound data, and text data (advice or the like) corresponding to the calculation result.

In the above-described embodiment, the processing unit 20 performs a process (step S17 in FIG. 9) of analyzing an exercise performed by the user so as to generate exercise analysis information after a command for stopping measurement is received, but the processing unit 20 may not perform this exercise analysis process (post-process). For example, the processing unit 20 may transmit various information stored in the storage unit 30 to an apparatus such as a personal computer, a smart phone, or a network server, and such an apparatus may perform the exercise analysis process (post-process).

In the above-described embodiment, the display apparatus 3 outputs exercise analysis information from the display unit 170 and the sound output unit 180, but is not limited thereto. For example, a vibration mechanism may be provided in the display apparatus 3, and various information may be output by causing the vibration mechanism to vibrate in various patterns.

In the above-described embodiments, the GPS unit 50 is provided in the exercise analysis apparatus 2 but may be provided in the display apparatus 3. In this case, the processing unit 120 of the display apparatus 3 may receive GPS data from the GPS unit 50 and may transmit the GPS data to the exercise analysis apparatus 2 via the communication unit 140, and the processing unit 20 of the exercise analysis apparatus 2 may receive the GPS data via the communication unit 40 and may add the received GPS data to the GPS data table 320.

In the above-described embodiment, the exercise analysis apparatus 2 and the display apparatus 3 are separately provided, but an exercise analysis apparatus in which the exercise analysis apparatus 2 and the display apparatus 3 are integrally provided may be used.

In the above-described embodiments, the exercise analysis apparatus 2 is mounted on the user but is not limited thereto. For example, an inertial measurement unit (inertial sensor) or a GPS unit may be mounted on the user's body or the like, the inertial measurement unit (inertial sensor) or the GPS unit may transmit a detection result to a portable information apparatus such as a smart phone, an installation type information apparatus such as a personal computer, and such an apparatus may analyze an exercise of the user by using the received detection result. Alternatively, an inertial measurement unit (inertial sensor) or a GPS unit which is mounted on the user's body or the like may record a detection result on a recording medium such as a memory card, and an information apparatus such as a smart phone or a personal computer may read the detection result from the recording medium and may perform an exercise analysis process.

In the above-described embodiments, an exercise in human walking is an object of analysis, but the present invention is not limited thereto, and is also applicable to walking of a moving object such as an animal or a walking robot. The present invention is not limited to walking, and is applicable to various exercises such as climbing, trail running, skiing (including cross-country and ski jumping), snowboarding, swimming, bicycling, skating, golf, tennis, baseball, and rehabilitation.

The above-described embodiment and the modification examples are only examples, and the present invention is not limited thereto. For example, the embodiment and the modification examples may be combined with each other as appropriate.

The present invention includes the substantially same configuration (for example, a configuration having the same function, method, and result, or a configuration having the same object and effect) as the configuration described in the embodiments. The present invention includes a configuration in which a non-essential part of the configuration described in the embodiments is replaced. The present invention includes a configuration which achieves the same operation and effect or a configuration which can achieve the same object as the configuration described in the embodiments. The present invention includes a configuration in which a well-known technique is added to the configuration described in the embodiments.

REFERENCE SIGNS LIST

1 EXERCISE ANALYSIS SYSTEM
2 EXERCISE ANALYSIS APPARATUS
3 DISPLAY APPARATUS
10 INERTIAL MEASUREMENT UNIT (IMU)
12 ACCELERATION SENSOR
14 ANGULAR VELOCITY SENSOR
16 SIGNAL PROCESSING PORTION
20 PROCESSING UNIT
30 STORAGE UNIT
40 COMMUNICATION UNIT
50 GPS UNIT
120 PROCESSING UNIT
130 STORAGE UNIT
140 COMMUNICATION UNIT
150 OPERATION UNIT
160 CLOCKING UNIT
170 DISPLAY UNIT
180 SOUND OUTPUT UNIT
210 BIAS REMOVING PORTION
220 REFERENCE VELOCITY CALCULATION PORTION
230 WALKING PROCESSING PORTION
232 WALKING DETECTION SECTION
234 WALKING CHARACTERISTIC INFORMATION CALCULATION SECTION
236 CORRELATION COEFFICIENT CORRECTION SECTION
238 WALKING VELOCITY CALCULATION SECTION
240 INTEGRAL PROCESSING PORTION
250 ERROR ESTIMATION PORTION
260 COORDINATE CONVERSION PORTION
270 EXERCISE ANALYSIS PORTION

The invention claimed is:

1. A correlation coefficient correction method comprising:
calculating a reference velocity by using a detection result in a first sensor, wherein the first sensor includes a positioning sensor mounted on a first portion of a moving object;
calculating characteristic information regarding walking of the moving object by using a detection result in a second sensor, wherein the second sensor includes an inertial sensor mounted on a second portion of the moving object; and
correcting a correlation coefficient in a correlation expression indicating a correlation between the characteristic information and a walking velocity or a stride of the moving object by using the reference velocity, wherein the walking velocity or the stride of the moving object is determined using the corrected correlation coefficient.

2. The correlation coefficient correction method according to claim 1, further comprising:
detecting a walking cycle of the moving object by using the detection result in the second sensor,
wherein the characteristic information is calculated in synchronization with the walking cycle.

3. The correlation coefficient correction method according to claim 2,
wherein the walking cycle is detected by using a vertical movement acceleration of the moving object.

4. The correlation coefficient correction method according to claim 2,
wherein a vertical movement velocity of the moving object is detected by using the detection result in the second sensor, and the walking cycle is detected by using the vertical movement velocity of the moving object.

5. The correlation coefficient correction method according to claim 2,
wherein the characteristic information is the amplitude of the vertical movement acceleration of the moving object in the walking cycle.

6. The correlation coefficient correction method according to claim 1,
wherein a reference stride is calculated by using the reference velocity, and the correlation coefficient in the correlation expression indicating the correlation between the characteristic information and the stride is corrected by using the reference stride.

7. The correlation coefficient correction method according to claim 1,
wherein the positioning sensor includes a sensor which receives a signal from a positioning satellite.

8. The correlation coefficient correction method according to claim 1,
wherein the inertial sensor includes an acceleration sensor.

9. An exercise analysis method comprising:
correcting the correlation coefficient by using the correlation coefficient correction method according to claim 1;
calculating the walking velocity or the stride of the moving object by using the corrected correlation coefficient;
estimating errors of indexes indicating a state of the moving object by using the calculated walking velocity or stride;

correcting the indexes by using the estimated errors; and analyzing exercise of the moving object by using the corrected indexes.

10. A correlation coefficient correction apparatus comprising:
 a reference velocity calculation section that calculates a reference velocity by using a detection result in a first sensor, wherein the first sensor includes a positioning sensor mounted on a first portion of a moving object;
 a walking characteristic information calculation section that calculates characteristic information regarding walking of a moving object by using a detection result in a second sensor, wherein the second sensor includes an inertial sensor mounted on a second portion of the moving object; and
 a correlation coefficient correction section that corrects a correlation coefficient in a correlation expression indicating a correlation between the characteristic information and a walking velocity or a stride of the moving object by using the reference velocity, wherein the walking velocity or the stride of the moving object is determined using the corrected correlation coefficient.

11. A non-transitory computer readable storage medium storing a program, which when executed by a computer, causes the computer to perform:
 calculating a reference velocity by using a detection result in a first sensor, wherein the first sensor includes a positioning sensor mounted on a first portion of a moving object;
 calculating characteristic information regarding walking of the moving object by using a detection result in a second sensor, wherein the second sensor includes an inertial sensor mounted on a second portion of the moving object; and
 correcting a correlation coefficient in a correlation expression indicating a correlation between the characteristic information and a walking velocity or a stride of the moving object by using the reference velocity, wherein the walking velocity or the stride of the moving object is determined using the corrected correlation coefficient.

* * * * *